United States Patent

[11] 3,618,030

[72] Inventor James R. Creasy
Lombard, Ill.
[21] Appl. No. 34,912
[22] Filed May 4, 1970
[45] Patented Nov. 2, 1971
[73] Assignee GTE Automatic Electric Laboratories Incorporated
Northlake, Ill.

[54] METHOD INCLUDING A PROGRAM FOR TESTING SELECTION MATRICES

4 Claims, 5 Drawing Figs.

[52] U.S. Cl. .......... 340/172.5, 340/166, 340/146.2
[51] Int. Cl. .......... G06f 11/00, G05b 1/01, G11c 7/00
[50] Field of Search .......... 340/172.5, 166, 146.1

[56] References Cited

UNITED STATES PATENTS

| | | | |
|---|---|---|---|
| 3,311,890 | 3/1967 | Waaben | 340/172.5 |
| 3,331,058 | 7/1967 | Perkins, Jr. | 340/172.5 |
| 3,337,849 | 8/1967 | Lowry | 340/166 |
| 3,411,137 | 11/1968 | Howells et al. | 340/172.5 |
| 3,444,522 | 5/1969 | Polhemus | 340/172.5 |
| 3,460,092 | 8/1969 | Davidson et al. | 340/166 |
| 3,477,064 | 11/1969 | Hilgendorf et al. | 340/172.5 |
| 3,524,165 | 8/1970 | Pritchard, Jr. et al. | 340/146.1 |

*Primary Examiner*—Gareth D. Shaw
*Assistant Examiner*—Jan E. Rhoads
*Attorneys*—Cyril A. Krenzer, K. Mullerheim, B. E. Franz and Glenn H. Antrim

ABSTRACT: The usual equipments of computers can be used to respond to a program to provide data that indicates location of a fault in a selection matrix of an alterable memory being tested. The data required is obtained from the summation of the addresses that are also the locations of selected words of the memory. Each different sum either indicates the exact fault, or designates that only a small number of certain component parts associated with a designated word location needs to be tested.

INVENTOR
JAMES R. CREASY
BY Glenn H. Antrim
ATTORNEY

METHOD INCLUDING A PROGRAM FOR TESTING SELECTION MATRICES

BACKGROUND OF THE INVENTION

This invention pertains to test methods for detecting and locating short circuits and open circuits in selection matrices of logic circuits. The faults are generally caused by defective isolating diodes or by defective transistors in the driving circuits.

Commonly, two groups of transistor driver circuits arranged in a matrix are connected through isolating diodes, that are connected as OR gates functioning as a buffer, to a group of operating conductors, for example, the word conductors of a memory. In this manner, $2n$ drive circuits can control as many as $n^2$ read circuits or write circuits.

The use of additional circuits connected to the selection matrices have been suggested for routine testing for short circuits. For example, in U.S. Pat. No. 3,337,849 issued to T. N. Lowry on Aug. 22, 1967 an additional translator is provided for use with an accuracy check circuit to provide indications of shorted diodes in associated selection matrices. In U.S. Pat. No. 3,460,092 issued to E. E. Davidson et al. on Aug. 5, 2969, a check circuit using varistors is shown; and in U.S. Pat. No 3,460,093 issued to Donald W. Huffman on Aug. 5, 1969, a check circuit using impedance-comparing means is described.

Special test circuits are not required in many types of computers where selection matrices can be tested by using a special test program to write in data and read out and compare data of selected memory locations. When a comparison shows that the data read is different from that written, the circuitry associated with the memory location is faulty. Additional testing is usually necessary to locate faults exactly. Since the operation of a memory caused by open or shorted diodes may be marginal, the test can be made more reliable by reducing the voltage of the power supplies that are connected to memory-driving circuits such as described in U.S. Pat. NO. 3,168,697 issued to W. S. Humphrey, Jr. on Feb. 2, 1965.

SUMMARY OF THE INVENTION

The present method of testing selection matrices uses a computer program to write word addresses into memory components, to read out these word addresses, and to sum the addresses that are read. The numbers for the addresses are also the same numbers indicating the word locations within the memory matrix, and only enough addresses need to be used to provide at least one reading for each row and each column of word locations. The sum of the addresses of a properly operating selection matrix is constant, and any faulty diode can be readily associated with a respective word location and also any faulty switching circuit can be readily located because the sum is a different known value according to the fault present. The sum that is derived from the test procedure is located in a table that shows the different sums for the different types of faults. The test method is particularly suitable for testing alterable memories in typical systems where testing can be performed by their own operational circuits, registers for temporarily storing information used in the testing procedure, and still another memory for temporarily storing during testing the information that must be destroyed at the selected word locations before starting the test procedure.

DESCRIPTION OF PREFERRED TEST METHODS

Figure 1:
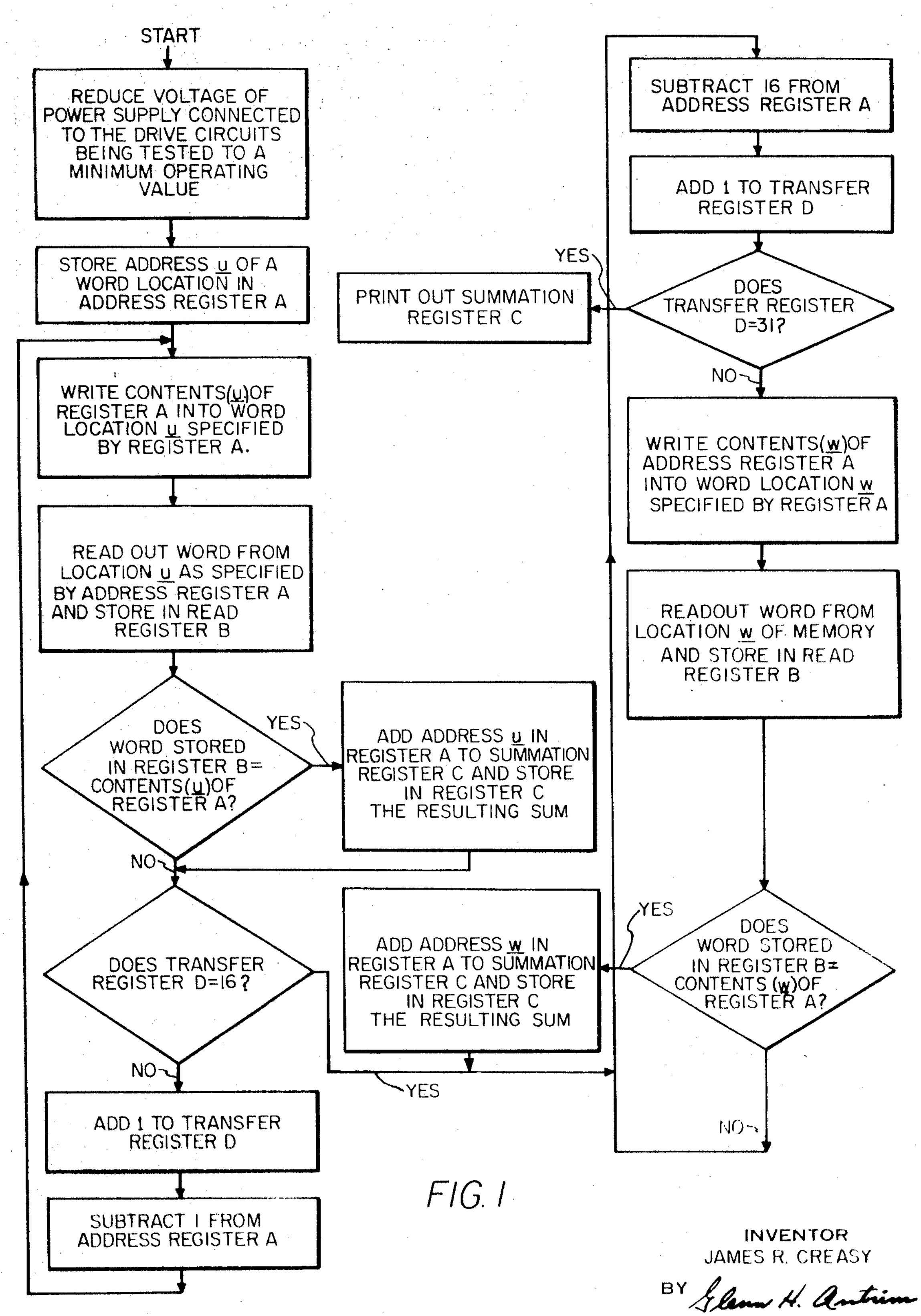
FIG. 1 is a flow chart of a test procedure for a selection matrix.
Figure 2:
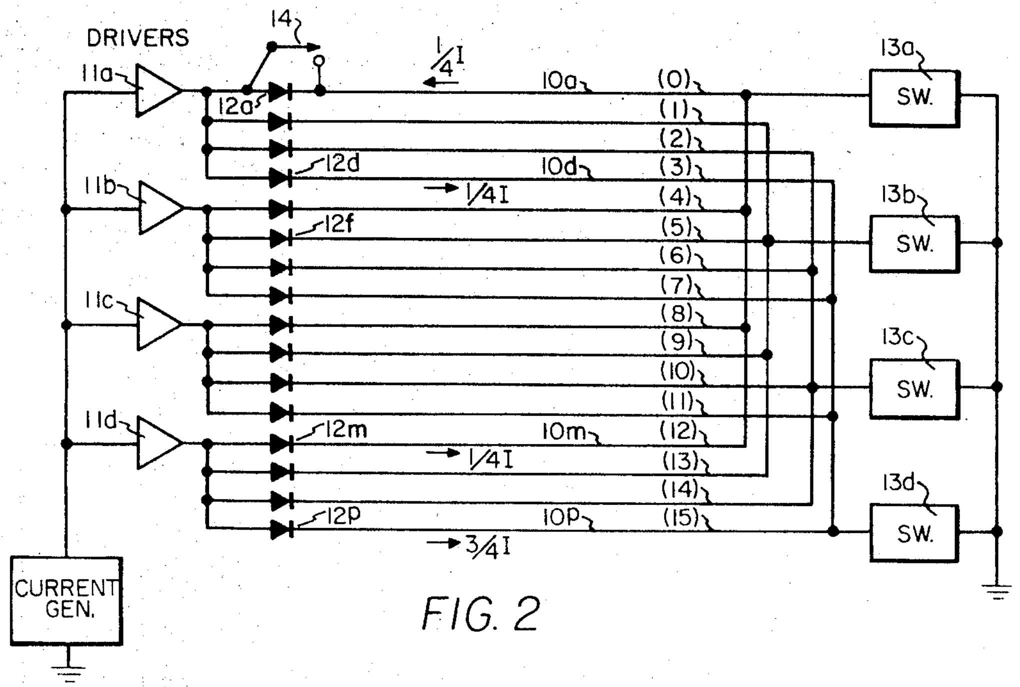
FIG. 2 is a schematic diagram of part of the circuits of a usual selection matrix to show the shunting effect of a shorted diode.
Figure 3:
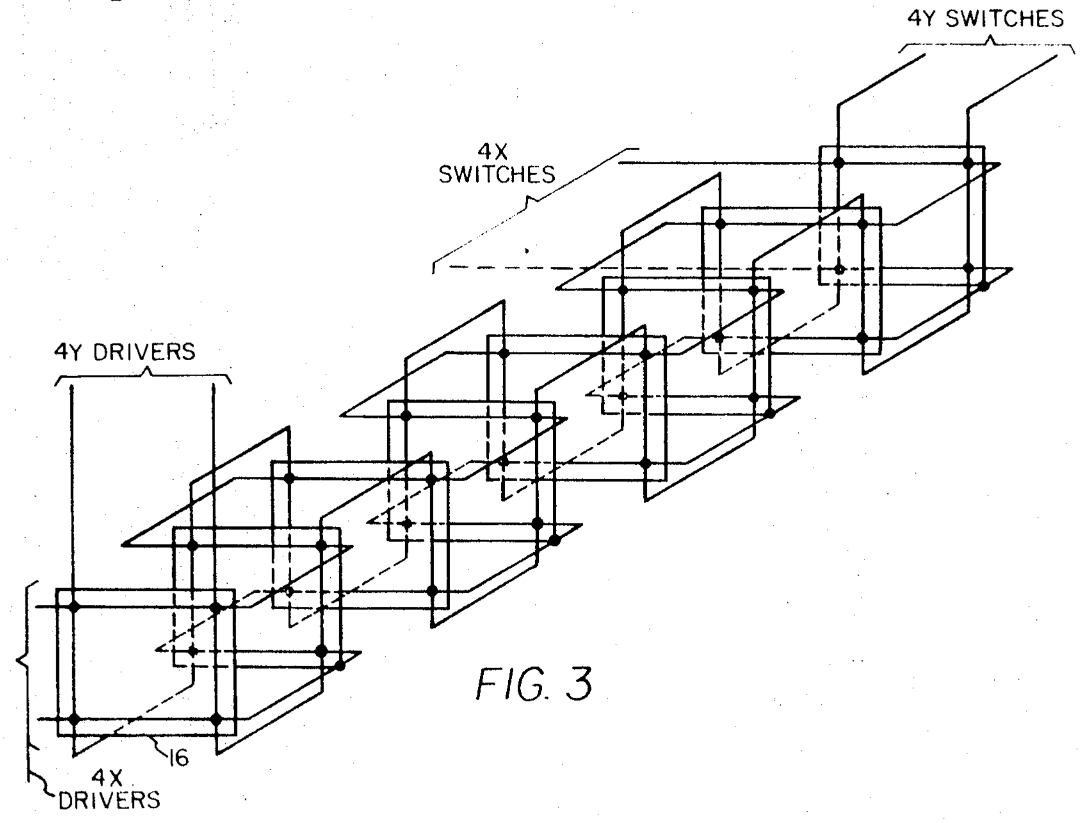
FIG. 3 is a simplified three-dimensional view of a plurality of magnetic memory planes.
Figure 4:
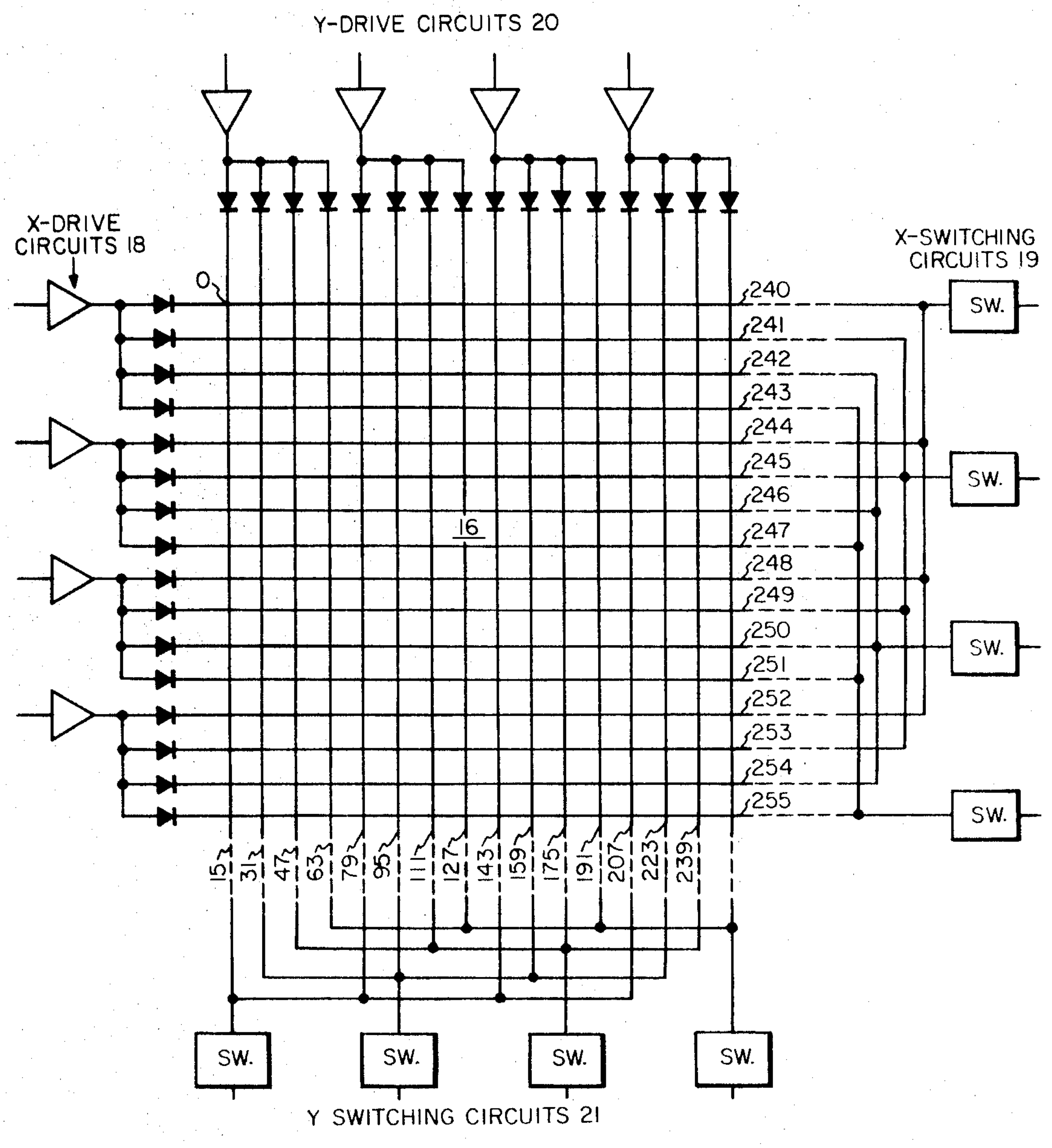
FIG. 4 is a schematic diagram of drive circuits for a single plane of a memory having magnetic storage components.
Figure 5:
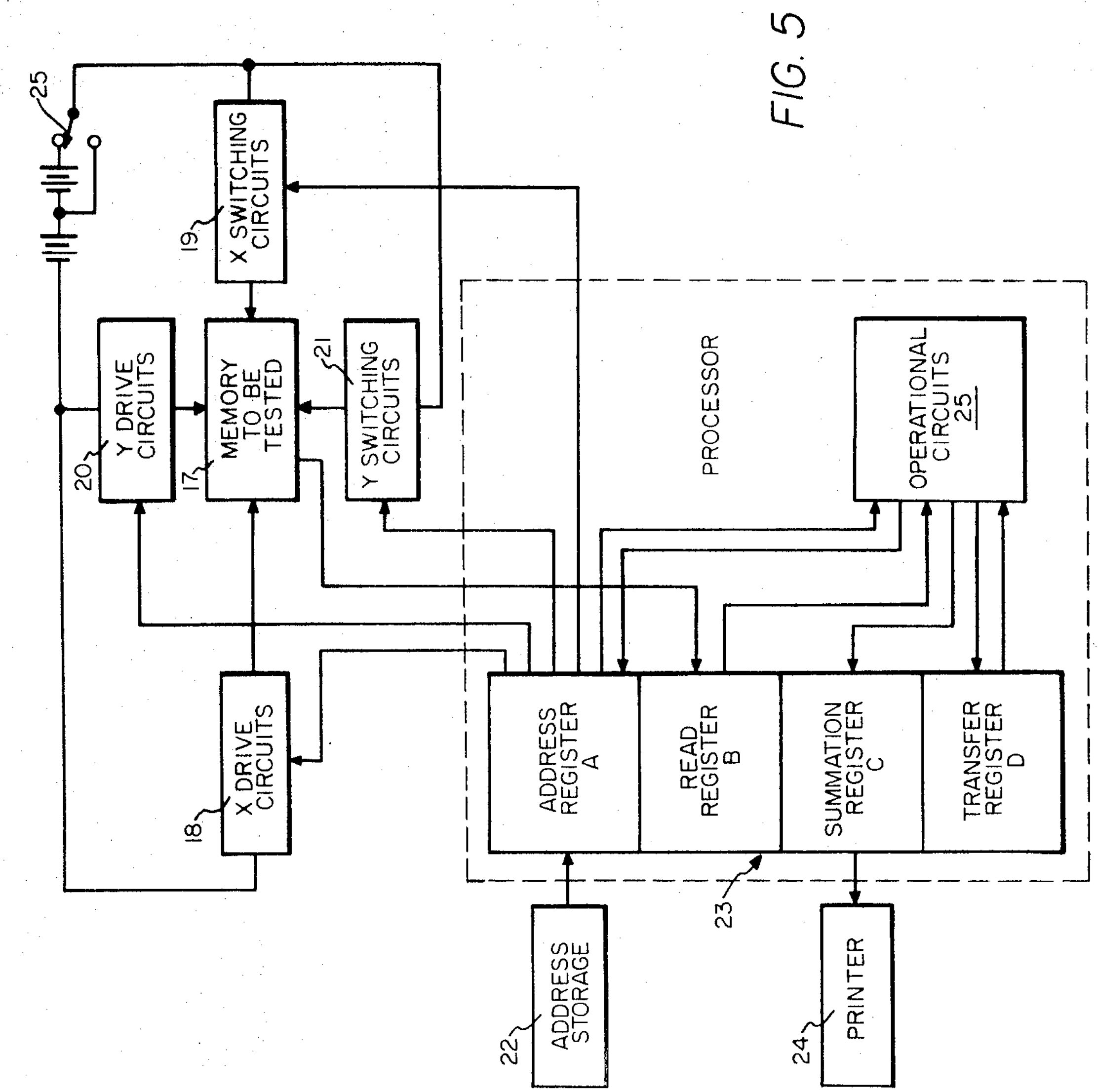
FIG. 5 is a block diagram of the computer system circuits used in testing for faulty circuits in a selection matrix.

The flow chart of FIG. 1 shows steps for using the circuits of FIG. 5 to test a selection matrix of FIG. 4 by writing addresses into word locations of a selected column and a selected row of its memory. The flow chart of FIG. 1 can be more readily understood by reviewing the effects of short circuit as illustrated in FIG. 2. FIG. 4 shows coordinate driving circuits for one of the planes of the several planes of a memory as illustrated in FIG. 3.

In FIG. 2, the operating conductors for only one coordinate of a 4×4 matrix are shown to illustrate the effects of a short circuit. This is a portion a matrix of a conventional-type memory requiring one-half currents in the X- and Y- coordinate drive circuits to write information into magnetic cores located at the cross-points of the coordinate drive lines. The usual matrix arrangement includes the drivers 11*a*– *d* connected through isolating diodes 12*a*–12*p*, the operating conductors 10*a*–10*p*, and through the electronic switches 12*a*–13 to a source of current. For example, to select the operating conductor 10*p*, the driver 11*d* and the switch 12*d* are selected to be operated simultaneously. Momentarily, current I normally flows through the diode 12*p* and the operating conductor 10*p* to the closed switching circuit 13*d*. When a diode that is connected to one of the other drivers and also to one of the diodes that is connected to the selected driver 11*d* is shorted, the current in the selected operating conductor 10*p* is reduced to three-fourths of its normal value. For example, when the diode 12*a* that is connected to the output of the driver 11*a* becomes short circuited such that the circuit would function as if a switch 14 were placed across the diode 12*a* and operated to its closed position, then shunting current can flow in a path that might typically have about three times the resistance of the selected circuit. As shown, current 1/4 I flows from the driver 11*e* through the diode 12*m*, the operating conductor 10*m* the operating conductor 10*a*, the shorted diode 12*a*,in a forward direction through the diode 12*d*, the operating conductor 10*d*, to the operated switch 13*d*. The current flow to the selected operating conductor 10*p* has therefore been decreased to three-fourths of its normal value. As to whether the decreased amount of current will perform its usual reading or writing operation is dependent upon how much greater the normal operating current is than the minimum amount of current that will cause a desired operation. The circuit may operate intermittently with decreased current dependent upon variations in supply voltage and changes in temperature. In order to increase the reliability of the testing method described in detail below, the operating voltage is first decreased to a value that will provide only enough current to insure normal operation so that three-fourths of this decreased amount is likely to cause failure.

By operating all drivers and all switches in all different combinations and noting where failures occur, the circuit having a failure can be associated with the location of a respective storage component in the memory. Providing the matrix is 3×4 or larger, the sum of the word addresses is different for each different fault. In the simplified diagram of FIG. 2, the location of the operating conductors have been numbered in sequence from 0 to 15 as shown in parenthesis. One of these to is to be read each time that a driver and a switch are selected in combination when no shunting or sneak paths are present. In the 4×4 matrix of FIG. 2, any shorted diode will provide, out of the 16 possible combinations, failures where sneak paths are present and seven good passes where there are no sneak paths. The seven good paths include the paths between the driver where the short circuit is located and each of the switches and the path between each of the drivers other than where the short is located and each switch that is connected directly through an operating conductor to the shorted diode. For example, when the diode 12*f* is shorted, the combination of drivers and switches that cause good passes and the respective words ( 0)–(15) that are read during the good passes are as follows:

| Drivers-Switches | Word Content |
|---|---|

| | | |
|---|---|---|
| 1. | 11a–13b | 1 |
| 2. | 11b–13a | 4 |
| 3. | 11b–13b | 5 |
| 4. | 11b–13c | 6 |
| 5. | 11b–13d | 7 |
| 6. | 11c–13b | 9 |
| 7. | 11d–13b | 13 |

The code number that identifies diode **12*f*** as being shorted is 45, the sum of the Word Content. By continuing this process for all the shorted diodes, a different sum will be obtained for each shorted diode. In this 4×4 matrix the sums are as follows:

| Faulty Diode | Summation of Memory Contents | Faulty Diode | Summation of Memory Contents |
|---|---|---|---|
| 12a | 30 | 12i | 54 |
| 12b | 33 | 12j | 57 |
| 12c | 36 | 12k | 60 |
| 12d | 39 | 12l | 63 |
| 12e | 42 | 12m | 66 |
| 12f | 45 | 12n | 69 |
| 12g | 48 | 12o | 72 |
| 12h | 51 | 12p | 75 |

A faulty driver or a faulty switch will cause a different sum form that caused by any faulty diode except when the address "0" is used. In FIG. 2, assume that switch **13*a* is shorted then only four of the possible 16 switch-driver combinations will cause normal current flow through the operating conductors 10*a* –10*p* because the use of any switch in the combination other than the shorted switch will cause current to the selected operating conductor to be approximately one-half of its normal value. The switch-driver combinations that provide readings when the switch 13*a*** is shorted are:

| | Driver-Switch Combinations | Word Content |
|---|---|---|
| 1. | 11a–13a | 0 |
| 2. | 11b–13a | 4 |
| 3. | 11c–13a | 8 |
| 4. | 11d–13a | 12 |

The code number that indicates that the switch **13*a*** is shorted is 24, the sum of the Word Content.

The process can be continued to derive code numbers for shorted drivers, and the sums of word content can be tabulated for shorted and open drivers, shorted and open switches, and shorted and open diodes. In the present example, the sum for a shorted driver can equal the sum for a shorted diode only because "0" has been used as being consistent with the usual word designations of a special computer system, but when the tests do not include the word location "0," all the sums are different. Even if "0" is used, the faults for different elements can be distinguished by keeping account of the number of good passes, because the number of good passes to provide a sum when one component is faulty is different from the number of good passes to cause the same sum when another component is faulty.

Word locations, which are also used as addresses, are shown along the bottom row and along the right-hand column of the memory plane of FIG. 4 that corresponds to plane 16 of FIG. 3. Although other word locations can be selected, this configuration is desirable in that it eliminates the "0" location that causes ambiguity of the sums as explained above, and this row and column are suitable choices when locations are to be dedicated permanently for testing purposes. Obviously, if the row and column are to be used for testing only, the addresses of the word locations can be left in permanently to eliminate the storing in another memory information read from the locations to be used for testing, destroying information at the locations selected for tests, writing the addresses for testing into the selected locations, and writing back into the tested memory the information that was temporarily destroyed. When the selected word locations are to be used only during the testing interval, a good choice of locations is along the diagonal that extends between the location with the address 15 and the location with the address 240. Obviously, the diagonal provides a minimum number of word locations for testing purposes, and the diagonal that includes the word location 15 according to the present numbering scheme is preferable to the other diagonal that includes the address "0."

With reference to FIG. 3, the failure resulting from a test at a word location shows that there has been an incorrect write-in or readout of a storage component for the word location on at least one of the planes. The amount of testing required to locate a defective diode after it has been associated with a word location is dependent upon whether a row and a column as shown in FIG. 4 have been used, or a diagonal of word locations as described above has been used. For simplicity, only one diode is shown in FIG. 4 for each of the two operating conductors associated with each word location, but in practice a diode is used in the writing circuits, and another diode is used in the reading circuits. The diodes are common to all the planes of the memory. Regardless of the pattern of word locations used, additional testing will be required to determine whether a diode in the writing circuit or a diode in the reading circuit for a particular word location is faulty. When the diagonal, rather than the row and column, is used, additional testing is required not only to determine whether the faulty diode is associated with writing or with reading but also whether the faulty diode is connected to the operating conductors in the X-coordinate direction or in the Y-coordinate direction.

Steps for testing the memory of FIG. 3 having a plane 16 shown in detail in FIG. 4 by the use of computer system components of FIG. 5 and the flow chart shown in FIG. 1 are as follows:

Word locations are selected to include each column and each row of the memory matrix of FIG. 3. As shown in FIG. 4, the right column and the lower row have been selected and the locations of the words in this row and this column have been indicated.

A list of addresses of respective locations is prepared for the selected row and the selected column to be written in as binary numbers into storage components representing bits in the different planes of the memory. Where required, the complement in binary form of the address may be used in addition to the binary address to fill remaining bit positions in the different planes of the memory.

A table is prepared showing the sums of the words to be expected when different faults exist. Also, the sum for a normally operating memory is especially noted.

When the selected word locations are to be used only during the testing period, the contents of a selected word location are read and stored in another memory that is usually located within the system being tested, and at the end of the test the stored contents are read back into the memory in their original locations.

In FIG. 5, the memory 17 includes the plane 16 of FIG. 3 having operating conductors in one coordinate direction connected to X-drive circuits 18 and switching circuits 19, and operating conductors in the other coordinate direction connected to Y-drive circuits 20 and switching circuits 21.

Beginning with the flow chart of FIG. 1, the operating voltage for the drive circuit and the switching circuit is first reduced to a minimum operating value. Switch 25 of FIG. 5 represents means for reducing the voltage by the required amount.

Addresses of the word locations to be interrogated sequentially are applied from an address storage 22 to an address register A that may be a section of an available register space 23. In the present example, the address 255 has been selected as the first word location to be used in the sequence of writing an interrogation. The register A commands the operation of the X-switching circuits 19, the Y-switching circuits 21, the X-drive circuits 18, and the Y-drive circuits 20 to write the address 255 into word location 255. The computer program then commands that the address that has been written into the location 255 be read and stored in read register B.

The operational circuits 25 of the computer compare the address stored in register B with the address stored in register A.

When the address stored in register B is equal to the address stored in the register A, the address in register A is added to the sum stored in register C, and the new sum is stored in the register C. Since the address 255 is the first address to be used in the testing sequence, the sum is also 255.

The operational circuits 25 determine whether the transfer register D has stored a number equal to 16. The transfer register D functions as a counter to keep track of the steps. Until the 16th step is completed, the register A subtracts 1 to provide the next address in sequence. After the address 255 has been used in the test procedure, the next address in the column is 254. Processing circuits add 1 to the transfer register D to indicate that the next step will be step 2 and subtracts 1 from the address register A to indicate that address 254 will be the next address used in the test.

Then as shown in the flow chart of FIG. 1, the procedure returns to the point where the content of register A, now 254, is written into the word location having the same number. Again the address is read out of the word location, compared, and when the address written in is equal to the address read out, 254 is added to 255 in register C.

In like manner, the procedure continues until the end location 240 of the column is reached.

After the addition of 240 to the sum, 1 is again subtracted from the address register A to provide the address 239 of the lower row of word locations.

After 239 has been added to the sum stored in register C, the operational circuits 25 determine that the number stored in the transfer register D is equal to 16 and the program is changed as shown in the right column of the flow chart of FIG. 1 to subtract 16 from address register A after each summation in order that the address for the next step will be equal to the address of the adjacent word location in the lower row.

The procedure then continues along the row until the operational circuits determine that the number stored in the transfer register D is equal to 31. The required number of steps for testing the memory has now been completed, and the program commands that the sum stored in register C be displayed or be printed.

If a sum does not equal the sum for a normal operating memory, reference is made to the previously prepared table to find what fault is indicated by the number printed out. As described above, tests confined to a few component parts may be required.

I claim:

1. The method of testing for faults in a selection matrix connected to a coordinate arrangement of memory storage components which are organized into uniquely addressable word locations, comprising:

a. Decreasing the power supply voltage of the drive circuits of the matrix to a value close to the minimum operating value for the circuits; b. Executing a computer program to operate computer circuits connected to the matrix in the following sequence of steps:

1. Select a list of locations for sequential testing such that at least one word location appears in each row and in each column of the memory storage components,
2. Write the address of the first selected word location into its respective storage components,
3. Read out and store the address that has been written into the selected location,
4. Compare the stored address read out of the selected location with the address that was written into said location in step b(2), where an unequal or an equal result respectively signifies a fault or no-fault condition for said location,
5. Add the compared address to a sum of the addresses of other selected word locations already found to be faultless, if said compared address was determined in step b(4) to be equal to the address that was written in,
7. Determine whether the word read out in step b(3) is the address of the last word location selected for testing the matrix, where the occurrence of said last location signifies completion of said testing,
7. Repeat steps b(2) through b(6) for the address of each succeeding word location in said list until the testing of said matrix has been completed in accordance with step b(6),
8. Read out the final sum of addresses obtained from the summation performed in step b(5), where every such sum, except a certain predetermined sum which uniquely represents a correctly operating matrix, indicates a different type of fault associated with a particular one of said selected word locations.

2. The method according to claim 1 wherein the word locations selected to have their addresses written in and read out in a predetermined sequence are selected sequentially in a column and then in a row of the storage components.

3. The method according to claim 1 wherein the word locations selected to have their addresses written in and read out in a predetermined sequence are selected sequentially along a diagonal line of the storage components.

4. The method according to claim 1 further including as step b(5) (a), the step of recording the number of addresses used in the summation.

* * * * *